No. 660,862. Patented Oct. 30, 1900.
L. D. LOVEKIN.
PIPE COUPLING.
(Application filed Apr. 11, 1900.)
(No Model.) 2 Sheets—Sheet 1.

WITNESSES: INVENTOR:

No. 660,862. Patented Oct. 30, 1900.
L. D. LOVEKIN.
PIPE COUPLING.
(Application filed Apr. 11, 1900.)

(No Model.) 2 Sheets—Sheet 2.

WITNESSES: INVENTOR:
L. D. Lovekin
by his attorney

UNITED STATES PATENT OFFICE.

LUTHER D. LOVEKIN, OF PHILADELPHIA, PENNSYLVANIA.

PIPE-COUPLING.

SPECIFICATION forming part of Letters Patent No. 660,862, dated October 30, 1900.

Application filed April 11, 1900. Serial No. 12,415. (No model.)

*To all whom it may concern:*

Be it known that I, LUTHER D. LOVEKIN, a citizen of the United States, residing in the city and county of Philadelphia, in the State of Pennsylvania, have invented certain new and useful Improvements in Pipe-Couplings, of which the following is a specification.

My invention relates to couplings employed to unite the meeting ends of pipe sections, and is of especial applicability to the union of sections of thin walled pipe.

It is the object of my invention to provide a pipe coupling, the parts composing which are simple and easily and quickly assembled, and especially inexpensive in that they require no finishing operations prior to their assembling, the arrangements being such, moreover, that when assembled an exceptionally tight and durable union is effected, with the result that the brazing of the pipes to the coupling rings, heretofore incident to the employment of couplings of this general class, is dispensed with.

In the accompanying drawings I show, and herein I describe, a good form of convenient embodiment of my invention, the particular subject matter claimed as novel being hereinafter definitely specified.

In the drawings, Figure 1 is a face view of one of the coupling rings, showing as in position therein the flanged end of a pipe section and the packing and locking ring, the uniting bolts being in section on the line 1 1 of Figure 2.

Similar letters of reference indicate corresponding parts.

Figure 1:
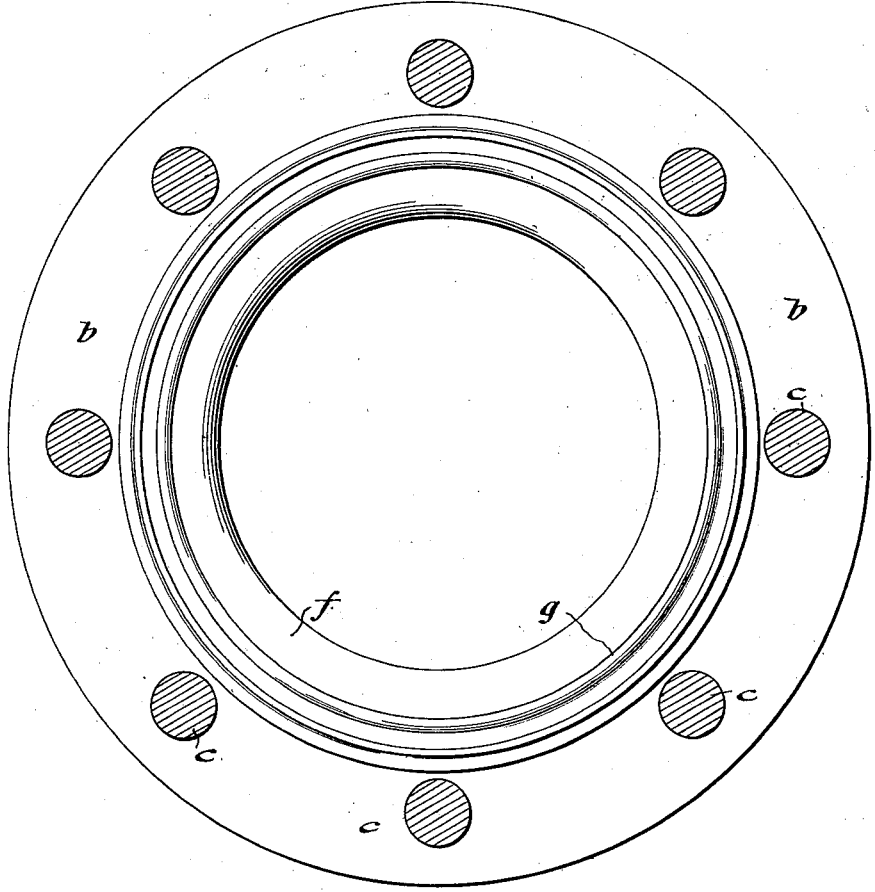

In the drawings $a$ $a$ are the adjacent ends of two pipe sections illustrated as coupled or united. $b$ $b$ are a pair of coupling rings, which respectively encircle the respective pipe sections near the meeting ends of the latter, and are united by a series of nut provided bolts $c$, of any usual character.

Figure 2:
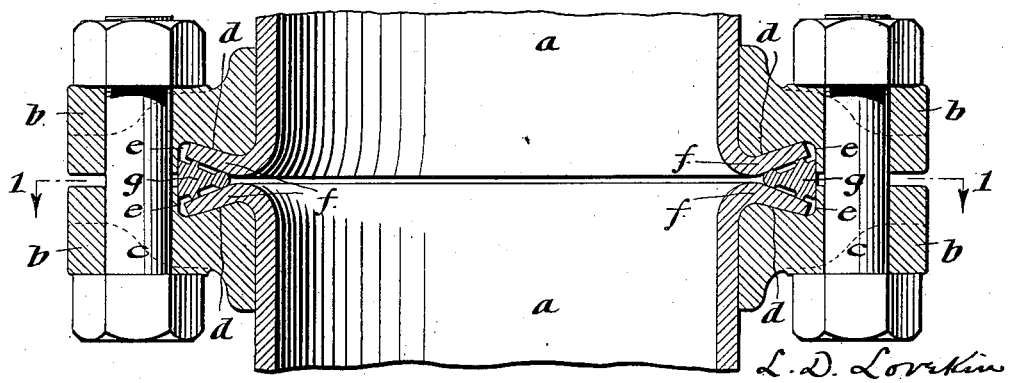
Figure 2 is a longitudinal section through the meeting ends of two adjacent pipe sections united by a coupling embodying a good form of my improvements.

Referring now to the preferred construction shown in Figures 1 and 2, the inner face of each coupling ring,—by which term I refer to that face of the ring which confronts its companion ring,—embodies an annular recess $d$, into which the coupling ring bore opens laterally, so to speak, said recess being shown as of gradually increasing depth from its inner edge to its outer. The outer edge walls $e$ of the recesses $d$, are vertically arranged,— that is to say, in parallelism with the axes of the bores of the rings. The inner end of each pipe section is flanged outwardly and rearwardly as shown particularly in Figure 2, to such inclination that the rear or under faces of the flanges $f$ rest against or snugly fit the bottoms of the annular recesses referred to.

As will be observed, the form of the annular recesses is such that when the two coupling rings are assembled, as shown in Figure 2, the conjoint recess formed by them may be said to resemble an undercut groove, in which the flanges $f$ of the pipe sections are entered, and by the overhanging lips of which said flanges are engaged.

$g$ is a packing and locking ring, as I term it, being an annulus of metal of such form as when the parts are assembled, to exist within the conjoint groove formed by the two annular recesses $d$ and between the respective flanges of the two pipe rings, so that when the coupling rings are drawn together by the tightening up of the nuts on the bolt $c$, the pipe flanges are compressed strongly upon said packing and locking ring. In its preferred embodiment, the packing and locking ring is, as shown, of approximately triangular section, with the result that when in place it approximately conforms to the correspondingly shaped annular space between the pipe flanges. Conveniently the packing and locking ring is provided, as to each face, with one or more ribs as shown. The outer or peripheral face of the packing and locking ring is cylindrical and snugly fits the outer wall edges $e$ of the annular recesses $d$.

As will be manifest, when the nuts upon the bolts $c$ are screwed tightly home, the coupling rings are caused to approach each other, and in so doing compress the pipe flanges against the respective sides of the packing and locking ring. A very tight union of the pipe sections with each other through the intermediate packing and locking ring is thereby effected, the escape of fluid through which is practically impossible. By reason of the rearward inclination of the flanges of the pipes against the inclined bottoms of the recesses $d$, and their pressure toward each other upon the interposing packing and locking ring of triangular section, it becomes practically impossible for one of said sections to become released from the joint, as traction exerted upon either of the sections tends to bind it more tightly in position.

In my construction it is immaterial that the exteriors of the pipe sections accurately fit the bores of the coupling rings, or that the flanges of the pipe sections accurately fit the recesses of said rings, and there is no accurate fitting required between the opposing faces of the flanges and the interposing packing and locking ring. The outer face of the packing and locking ring should accurately fit the walls $e$ of the recesses $d$. As shown, the packing and locking ring is provided with one or more ribs or ridges, with which the pipe flanges engage, and while said ribs are not essential, I prefer to employ them to increase the tightness of the joint or closure between the locking ring and the pipe flanges, by yielding or flattening slightly as to their crests, under their contact with the pipe flanges, when heavy force is applied to the nuts in the tightening up of the joints.

Figure 4:
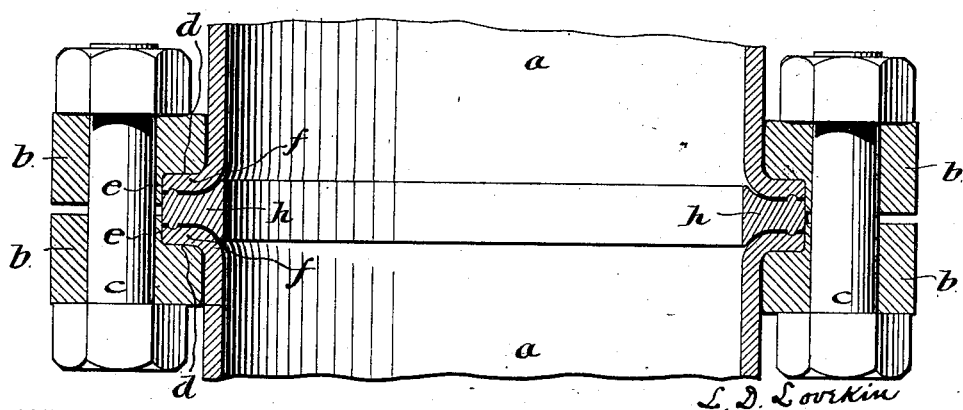
Figure 4 is a longitudinal section through the meeting ends of two adjacent pipe sections united by a coupling, embodying a modified form of my improvements.

In my construction it is unnecessary to braze the coupling rings to the pipe sections, as has heretofore been the custom, and a very distinct crevice may, without detracting from the tightness of the union, exist, as indicated by the heavy shade lines in Figure 4, between the bores of the coupling rings and the faces of the pipes extending through said rings.

As the outer face of the packing and locking ring is, as stated, vertical, and the outer wall edges $e$ of the recesses $d$ vertical, said face of the packing and locking ring serves as a guide, so to speak, for the coupling rings in their approach, with the result that said rings move on right lines toward each other; the contact of the outer face of the packing and locking ring moreover with the outer edge of the recesses $d$, supports said coupling rings against the strain due to the tightening up of the nuts, and causes them to resist the tendency to bow under such strain.

Figure 3:
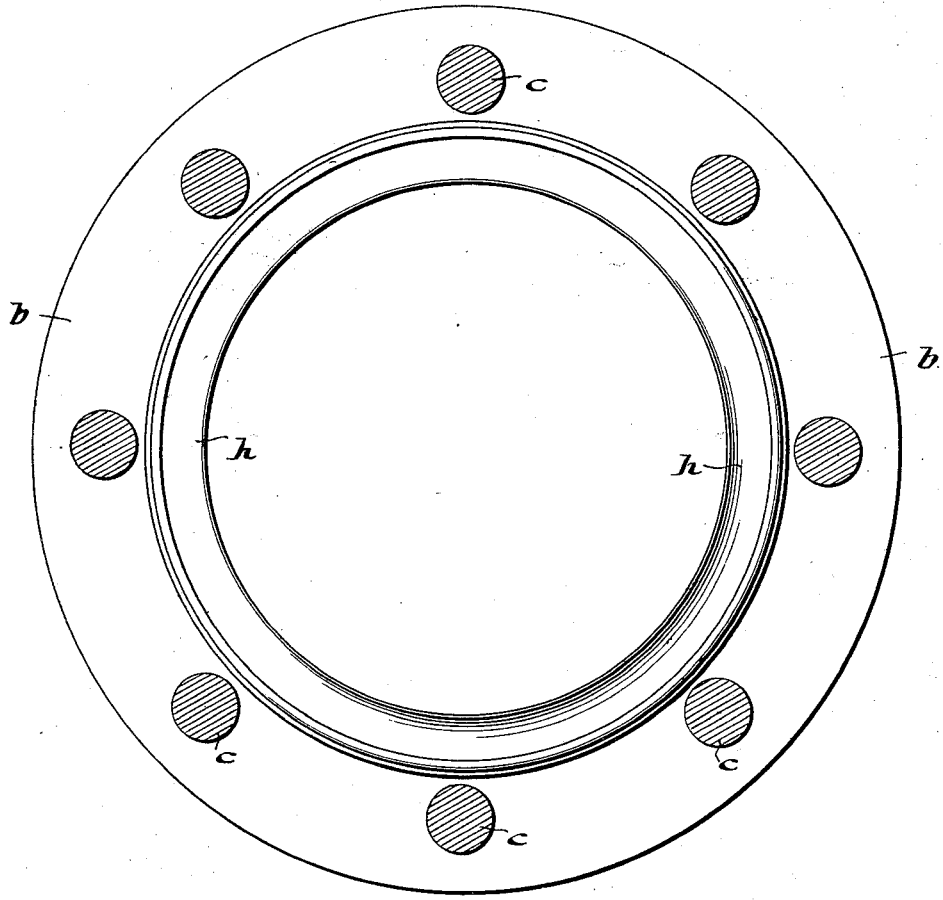
Figure 3 is a face view of one of the coupling rings, showing as in position therein a modified form of packing and locking ring.

In the modified construction shown in Figures 3 and 4, the recesses $d$, instead of being of gradually increasing depth from their inner to their outer edges, are shown as of uniform depth from their inner to their outer edges, and the flanges $f$, formed on the pipe sections, are correspondingly arranged in planes perpendicular to the axes of the pipe sections, so as to fit against the bottoms of said recesses. The outer edge walls $e$, of said recesses are, however,—as shown in the preferred construction already described,—straight walled, that is to say, in parallelism with the axis of the sections.

In the modified construction the packing and locking ring, designated $h$ in the illustration of such construction, instead of being of approximately trianglar section, as shown in Figure 2, does not diminish in breadth from its outer edge to its inner, but on the contrary, is of substantially uniform thickness from its outer edge to a point near its inner edge, where it flares to an increased thickness, as shown in Figure 4. As thus formed, the packing and locking ring fills the annular space existing between the opposing flanges $f$, practically excluding the fluid therefrom, with the result that the flow of the fluid through the united sections is subject to the minimum of friction or retardation.

The packing and locking ring in the modified construction is preferably formed with a rib or bead on each side, as already described with reference to the preferred construction. The outer face of the packing and locking ring is cylindrical and operative in connection with the vertical walls $e$, in the manner already described with relation to the preferred construction.

As will be understood, when the parts are assembled and secured in final position, the outwardly turned flanges of the pipes are caught and held or locked in position, so to speak, by the packing and locking ring, against the respective inner faces of the coupling rings, with the result that the parts are very strongly held in their assembled relationship, and the union rendered very durable and liquid tight.

Having thus described my invention, I claim—

1. The combination to form a pipe coupling, of two pipe sections, coupling rings through which said pipe sections are entered, the opposing faces of which rings are provided with recesses of increasing depth from their inner to their outer portions in which rearwardly bent flanges on said pipes are entered, a packing and locking ring of triangular section disposed between the flanges of the respective pipe sections, and means for drawing such coupling rings together.

2. The combination to form a pipe coupling, of two pipe sections, coupling rings through which said pipe sections are entered, the opposing faces of which rings are provided with recesses of gradually increasing depth from the ring bores outward in which flanges on said pipes are entered, a packing and locking ring disposed between the flanges of the respective pipe sections, and means for drawing such coupling rings together.

3. The combination to form a pipe coupling of two pipe sections, coupling rings through which said pipe sections are entered, the opposing faces of which rings are provided with recesses of gradually increasing depth from their inner to their outer edges outward in which flanges on said pipes are entered, a packing and locking ring of triangular section disposed between the flanges of the respective pipe sections, and means for drawing such coupling rings together.

4. The combination, to form a pipe coupling, of two pipe sections, outwardly turned flanges formed on said sections, coupling rings in which said pipe sections are entered, the opposing faces of which rings are provided with recesses, the outer portions of which are as deep as or deeper than portions near the inner edges thereof, and in which recesses flanges on said pipes are entered, a packing and locking ring having a rib or ridge on each of its respective faces disposed between the flanges of the respective pipe sections, and means for drawing such coupling rings together.

5. The combination, to form a pipe coupling, of a pair of pipe sections which have each an outwardly and rearwardly turned flange, a pair of coupling rings through which the respective pipe sections extend, which coupling rings embody recesses for the reception of said flanges, a packing and locking ring of triangular section having an annular bead or rib on each face and disposed between the pair of flanges, and means for drawing the coupling rings together, substantially as set forth.

6. The combination, to form a pipe coupling, of two coupling rings, the opposing faces of which are each provided with an annular recess having a vertical outer edge, two flanged pipe sections respectively entered through said respective coupling rings, a packing and locking ring of metal having an outer circumferential face which is parallel with the axis of the pipe sections and in contact with the vertical outer edges of the annular recesses of both coupling rings, the flanges of the pipe sections being engaged by and between the bases of the recesses and the packing and locking ring, and means for drawing said coupling rings together, as specified.

7. The combination, to form a pipe coupling, of two coupling rings each of which is provided as to its face with a straight or vertically extending wall or edge portion in parallelism with its bore, a packing and locking ring of metal, the exterior face of which is in approximate parallelism with its axis, said face of said locking ring being in contact with the two vertically extending walls of the coupling rings, and by which face both coupling rings are maintained against a tendency to become bowed, two pipe sections having outwardly turned flanges, which sections extend respectively through the respective coupling rings and which flanges are each engaged between one of the respective coupling rings and one of the faces of the packing and locking ring, and means for securing said coupling rings together, as specified.

8. The combination to form a pipe coupling, of two pipe sections, coupling rings the meeting faces of which are each provided with an annular recess having a vertical outer edge, a packing and locking ring of approximately triangular section the outer face of which is parallel with the axis of the pipe sections, to serve as a guide and support for the coupling rings, flanges formed on said pipe sections and compressed between the faces of the recesses and the respective faces of the locking ring and means for drawing said coupling rings together.

In testimony that I claim the foregoing as my invention I have hereunto signed my name this 9th day of April, A. D. 1900.

LUTHER D. LOVEKIN.

In presence of—
F. NORMAN DIXON,
THOS. K. LANCASTER.